(No Model.)
A. P. DABOLL.
FRICTION ROLLER BUSHING OR BEARING.
No. 310,259. Patented Jan. 6, 1885.
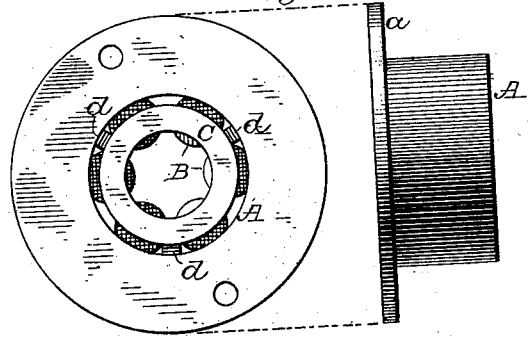
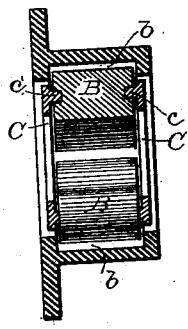
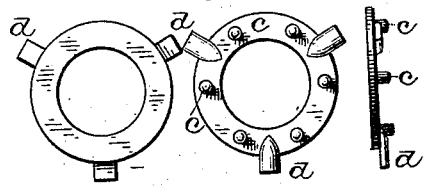
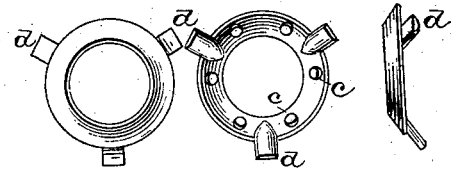
Attest:
Philip F. Larned.
Nowell Bartle.
Inventor:
Austin P. Daboll.
By Wm C Mird
Attorneys.

UNITED STATES PATENT OFFICE.

AUSTIN P. DABOLL, OF NEW LONDON, CONNECTICUT.

FRICTION-ROLLER BUSHING OR BEARING.

SPECIFICATION forming part of Letters Patent No. 310,259, dated January 6, 1885.

Application filed December 2, 1882. (No model.)

*To all whom it may concern:*

Be it known that I, AUSTIN P. DABOLL, of the town and county of New London, in the State of Connecticut, have invented certain new and useful Improvements in Friction-Roller Bushings or Bearings for use in Blocks, Sheaves, and other Similar Apparatus; and I do hereby declare that the following specification, taken in connection with the drawings furnished and forming a part of the same, is a clear, true, and complete description of my invention.

The value of friction-roller bearings in pulley-blocks and other similar connections is well known, and it is equally well known that as heretofore constructed such bearings involve more or less machine work in connection with screws, tapped holes, riveting, &c., which so adds to the cost of such bearings as to practically exclude them from certain cheap grades of blocks, and from various other similar articles in which they would be desirable if afforded at low cost. The object of my improvements is to so simplify their construction as to materially reduce their cost without impairing their efficiency.

After fully describing a bushing or bearing embodying my improvements, the features deemed novel will be specified in the several clauses of claims hereunto annexed.

Referring to the drawings, Figure 1 illustrates one of my bearings in end and edge view. Fig. 2 is an axial sectional view of the same. Fig. 3 illustrates a novel pivot-ring, as devised by me, in three views, showing the two sides and edge thereof, and detached from the bearing. Fig. 4 in three views similarly illustrates said pivot-ring in its normal condition before it is applied to the bearing, and combined with the usual shell and friction-rollers.

The solid shell A is substantially as heretofore, and is provided with the usual flange $a$ and usual internal annular recess $b$ for the reception of the rollers B, each of which, as heretofore, is axially bored at each end for the reception of axial pivots on which said roller revolves.

The pivot-rings C, when in position in the bearing, are located at each end of the annular recess $b$ of the shell, and each of said rings is provided on its inner face with the annular series of inwardly-projecting roller-pivots $c$, each of which occupies the axial bearing at one end of a roller. Each ring C is also provided with three or more lugs, $d$, equally distributed around and projecting radially from the periphery thereof, and when in position within the shell the ends of said lugs take such endwise bearing against the annular surface of the annular recess as to locate said rings centrally, and such lugs also take such flatwise contact with the ends of said recess as to properly confine the rings and the rollers pivoted thereto within said recess. I prefer that these rings be turned off slightly in a lathe-chuck, so as to afford a slight shoulder at the base of each lug.

The rings C in their normal condition are of the form as illustrated in Fig. 4, and each is substantially a cross-section or frustum of a hollow cone, with the lugs projecting downwardly and outwardly from its lower edge. A ring in this form provided with the pivots and lugs or with pivotal bearings is a novel article of manufacture of value for general sale and use in the manufacture of friction-roller bearings.

It will be readily seen that one of said rings may be readily introduced into the center of the shell and then flattened out, thus increasing its diameter, and causing its lugs to properly occupy the annular recess. The rollers are then placed in position with their axial bearings in each case occupied by one of the pivots $c$, whereupon another ring in its normal condition is placed at the other end of the annular recess, and, with its pivots in proper coincidence with the axial bearings of the rollers, is then forced inwardly into a flattened condition, thus causing its lugs to spread and occupy the annular recess and thereby confine the rollers in their proper working position, the two inner faces of both rings being parallel with each other and with the squared-up ends of the rollers.

It is obvious that the rings C may be so proportioned that, when flattened, their peripheries will be in close contact with the adjacent annular surface of the shell outside of the annular recess; or a space may exist between the periphery of each ring and the shell, and the ends of the lugs may or may not all be in abutting contact with the shell, without departure from my invention or materially affecting the value of the bearing. It is also obvious that but one of my pivot-rings need be employed, if at one end of the annular recess the shell be itself so far inwardly extended as to enable the development of roller-pivots on the inner surface thereof, or otherwise affording bearings for the rollers; and while such a construction, if used with one of my rings would involve a portion of my invention, I prefer the employment of two rings, as shown. It is also obvious that the rollers may be provided with axes at one or both ends, integral with the rollers or inserted therein, and that one or both of the conical rings may be provided with a series of bearings for the reception of the roller axes; and while I do not exclude myself from such a converse modification in construction, I prefer that the pivot-ring be provided with the pivots themselves, as shown, instead of with pivot-bearings for receiving roller pivots or axes.

It will be seen that in accordance with my invention I am enabled to produce at low cost a durable and thoroughly effective friction-roller bearing, and that when a bearing is worn out internally at the pivot-bearings new rollers and rings may be readily substituted for the old ones.

When the rings are carefully proportioned, the first one inserted into the shell may be previously flattened, because the annular recess being then unoccupied by the rollers will allow the ring to be entered edgewise.

Flat pivot-rings with lugs have heretofore been used in connection with a casing constructed in sections and held together by a peripheral band; but it will be seen that my rollers and pivot-rings are combined with a solid shell, thus obviating the cost incident to the sectional construction, and obtaining with a minimum of metal a strong and reliable casing to which the rollers and rings are properly connected.

Having thus described my invention, I claim as new and desire to secure by Letters Patent—

1. The method of uniting the rollers, pivot-rings, and solid shell of friction-bearings, substantially as hereinbefore described, by expanding one or both of said rings from a conical to a flattened condition after insertion within the shell and while in proper relation to said rollers.

2. The combination, with the internally annularly-recessed solid shell and friction-rollers, of the rings provided with pivots which occupy the axial bearings of the rollers, and are also provided with radial lugs which occupy the annular recess of the shell, substantially as described.

3. The combination, with the internally annularly-recessed solid shell and friction-rollers, of pivot-rings provided with lugs, which have sidewise bearing against the inner surface of the shell at the end of the annular recess, substantially as described.

4. The combination, with a solid shell having an internal annular recess and a series of friction-rollers, of one or more roller pivot-rings provided with radial lugs, and secured within the annular recess by peripheral expansion, substantially as described.

5. The conical pivot-ring provided with radial lugs, substantially as described.

AUSTIN P. DABOLL.

Witnesses:
CHARLES B. DABOLL,
WILSON DABOLL.